United States Patent
Watanabe

(10) Patent No.: US 11,772,010 B2
(45) Date of Patent: Oct. 3, 2023

(54) EXTRACT PRODUCTION SYSTEM AND METHOD FOR PRODUCING EXTRACT

(71) Applicant: The Coca-Cola Company, Atlanta, GA (US)

(72) Inventor: Akira Watanabe, Tokyo (JP)

(73) Assignee: THE COCA-COLA COMPANY, Atlanta, GA (US)

(*) Notice: Subject to any disclaimer, the term of this patent is extended or adjusted under 35 U.S.C. 154(b) by 188 days.

(21) Appl. No.: 16/065,469

(22) PCT Filed: Dec. 26, 2016

(86) PCT No.: PCT/JP2016/088628
§ 371 (c)(1),
(2) Date: Jun. 22, 2018

(87) PCT Pub. No.: WO2017/111151
PCT Pub. Date: Jun. 29, 2017

(65) Prior Publication Data
US 2018/0369717 A1    Dec. 27, 2018

(30) Foreign Application Priority Data

Dec. 25, 2015    (JP) .............................. 2015-254218

(51) Int. Cl.
*B01D 11/02* (2006.01)
*B01D 11/04* (2006.01)

(52) U.S. Cl.
CPC .......... *B01D 11/0292* (2013.01); *B01D 11/02* (2013.01); *B01D 11/028* (2013.01); *B01D 11/0488* (2013.01)

(58) Field of Classification Search
CPC ... B01D 11/0292; B01D 11/02; B01D 11/028; B01D 11/029; B01D 11/0488
See application file for complete search history.

(56) References Cited

U.S. PATENT DOCUMENTS

| 4,257,945 A * | 3/1981 | Martel | .................... C11B 9/025 512/5 |
| 2016/0158763 A1* | 6/2016 | Sano | ....................... C02F 11/12 62/62 |

FOREIGN PATENT DOCUMENTS

| CN | 203763899 U | 8/2014 |
| JP | H1119402 A | 1/1999 |
| WO | WO-2015015631 A1 * | 2/2015 ......... B01D 11/0288 |

OTHER PUBLICATIONS

Sloley, "Flow: Avoid Splitting Headaches," Chemical Processing 2013, accessed on the Internet at https://www.chemicalprocessing.com/articles/2013/flow-avoid-splitting-headaches/ on Sep. 22, 2019, 7 pages. (Year: 2013).*

(Continued)

*Primary Examiner* — Patrick Orme
(74) *Attorney, Agent, or Firm* — Eversheds Sutherland (US) LLP

(57) ABSTRACT

The present application provides an extract production system. The extract production system includes an extraction unit for extracting an extract from a starting material by using a solvent flowing into the interior thereof, a first heat exchange unit for subjecting the solvent flowing into the extraction unit to heat exchange by using a heat exchange medium, and a second heat exchange unit for subjecting the solvent which underwent heat exchange in the first heat exchange unit to heat exchange by reusing the heat exchange medium which underwent heat exchange in the first heat exchange unit.

8 Claims, 7 Drawing Sheets

(56) References Cited

OTHER PUBLICATIONS

International Search Report and Written Opinion, PCT/JP2016/088628, dated Feb. 28, 2017 (6 pp ).

\* cited by examiner

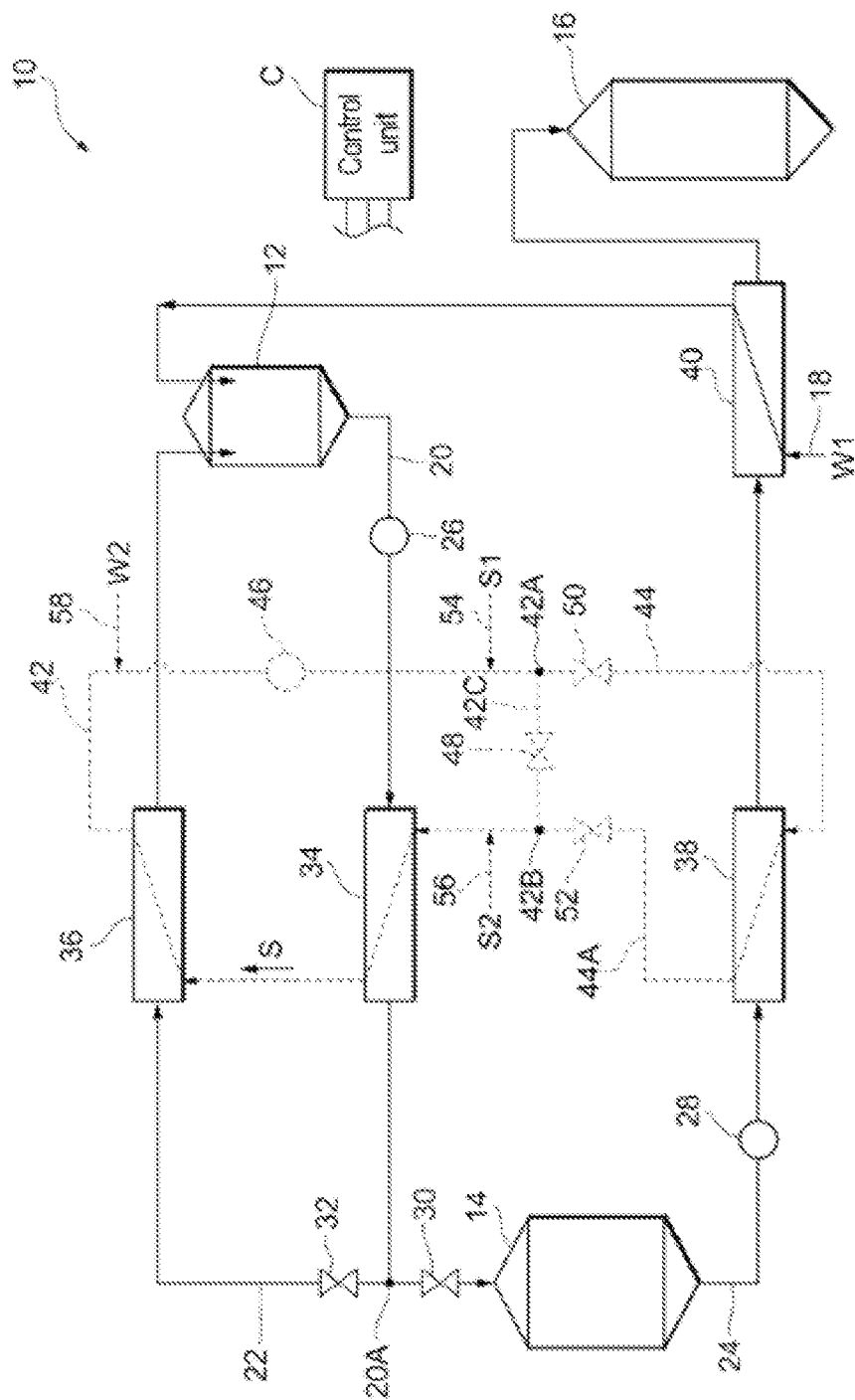
[Fig. 1]

[Fig. 2]
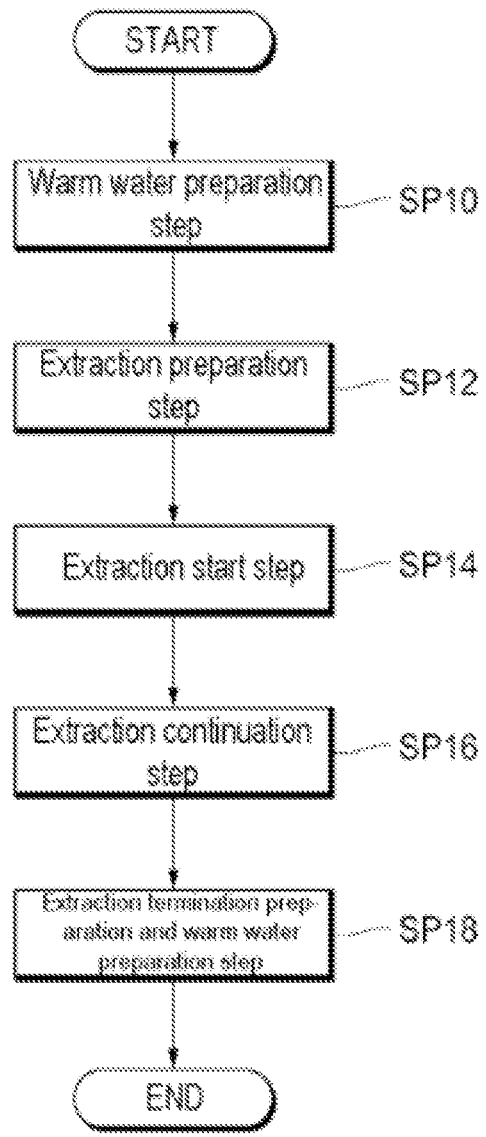

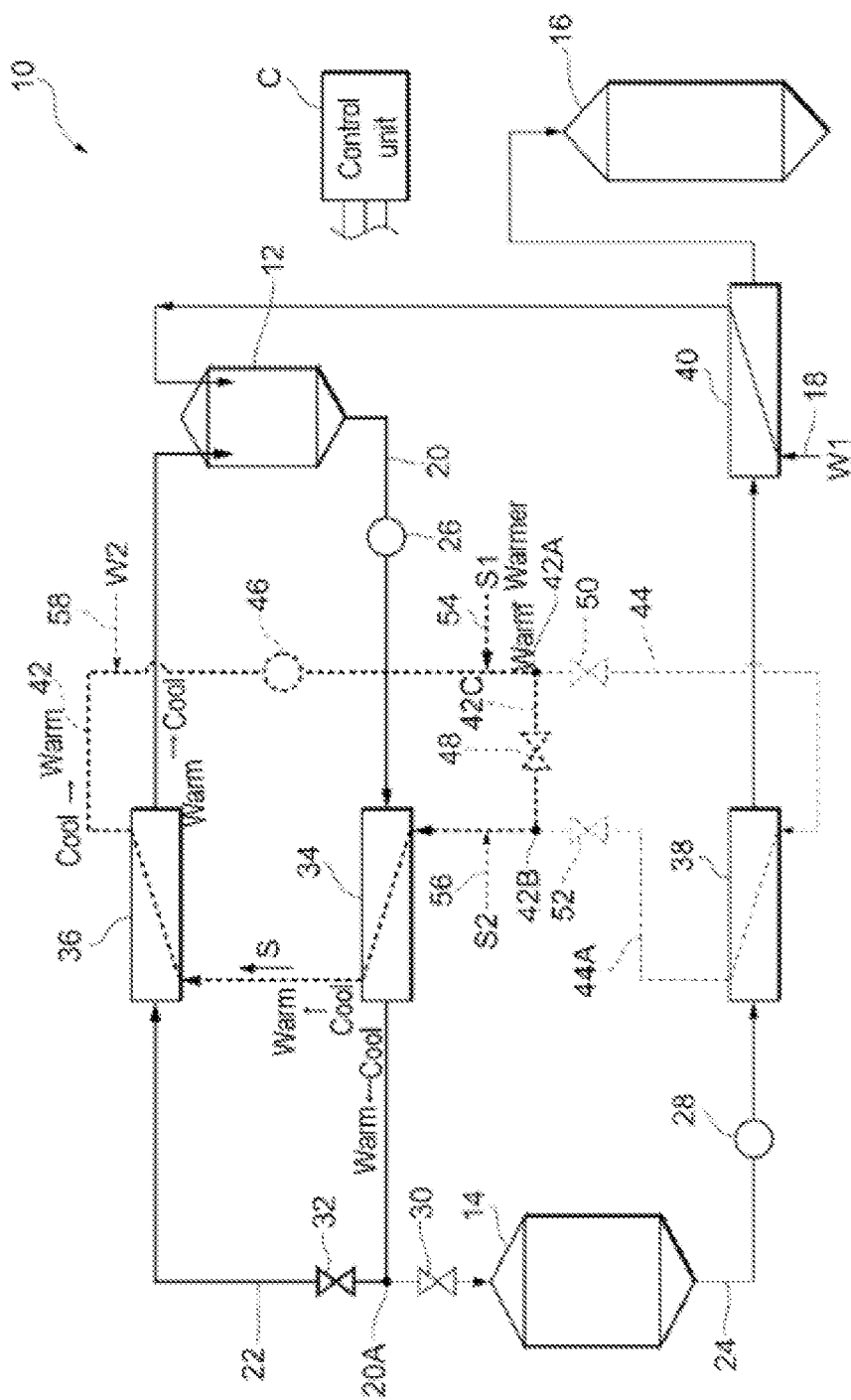
[Fig. 3]

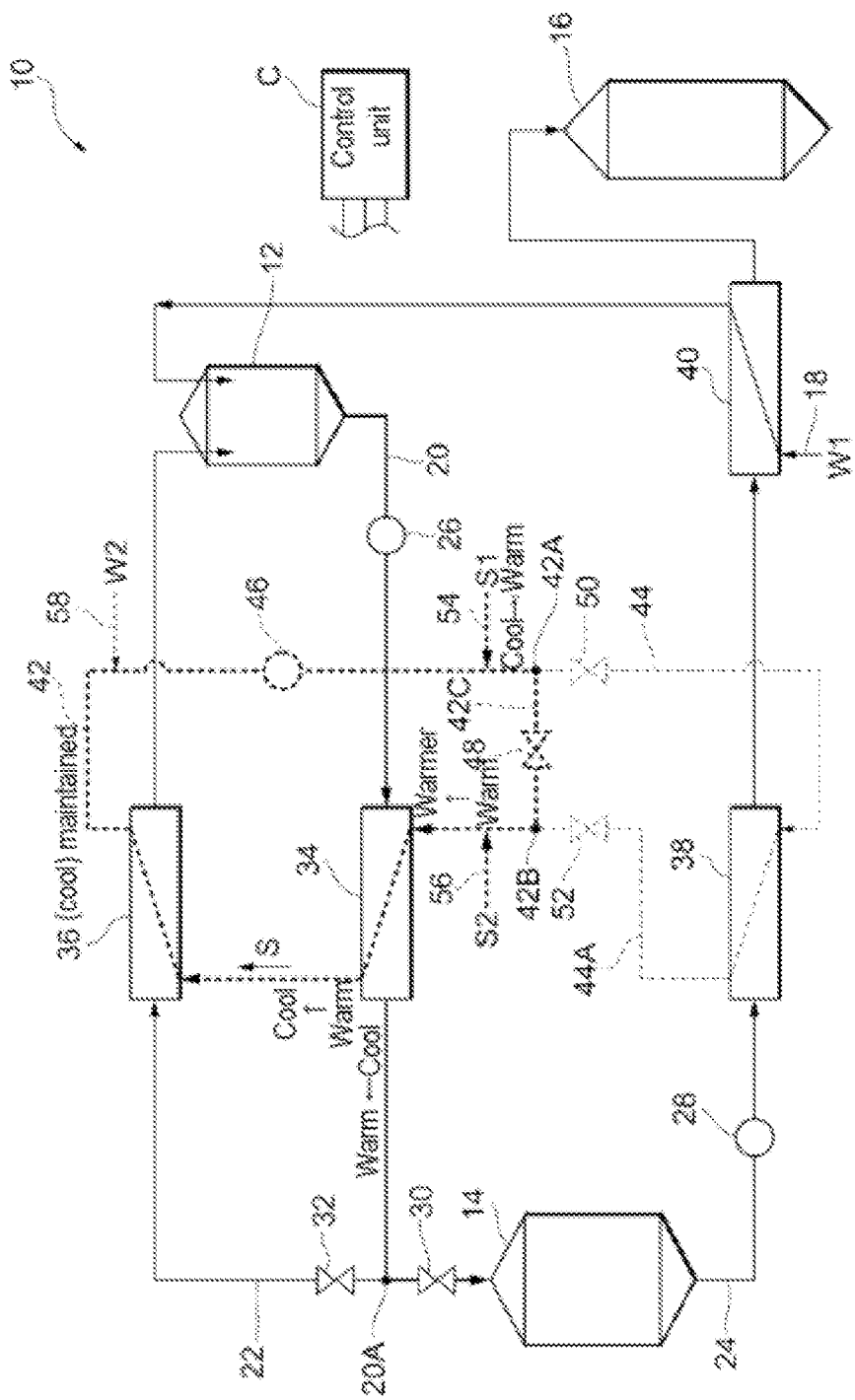

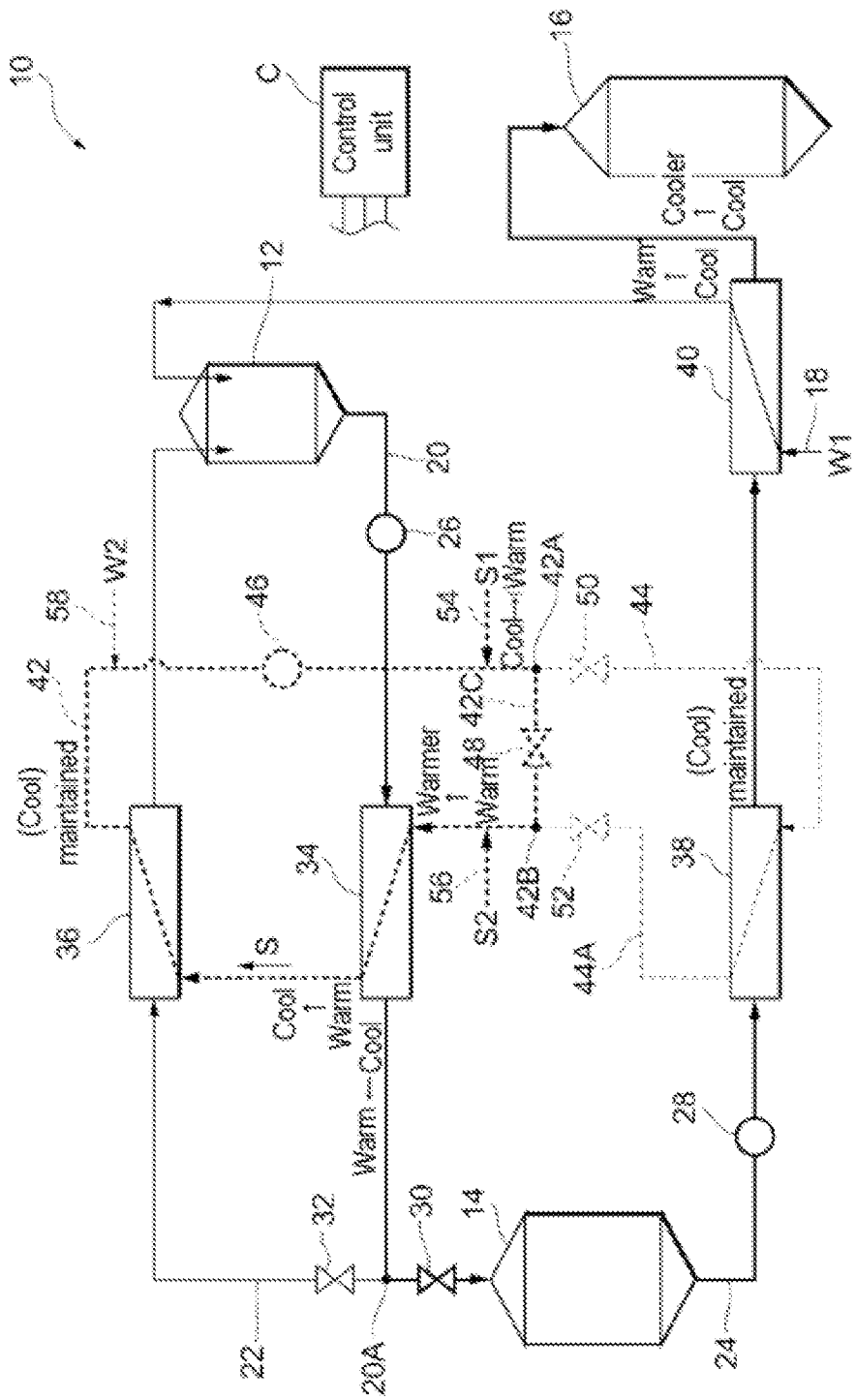

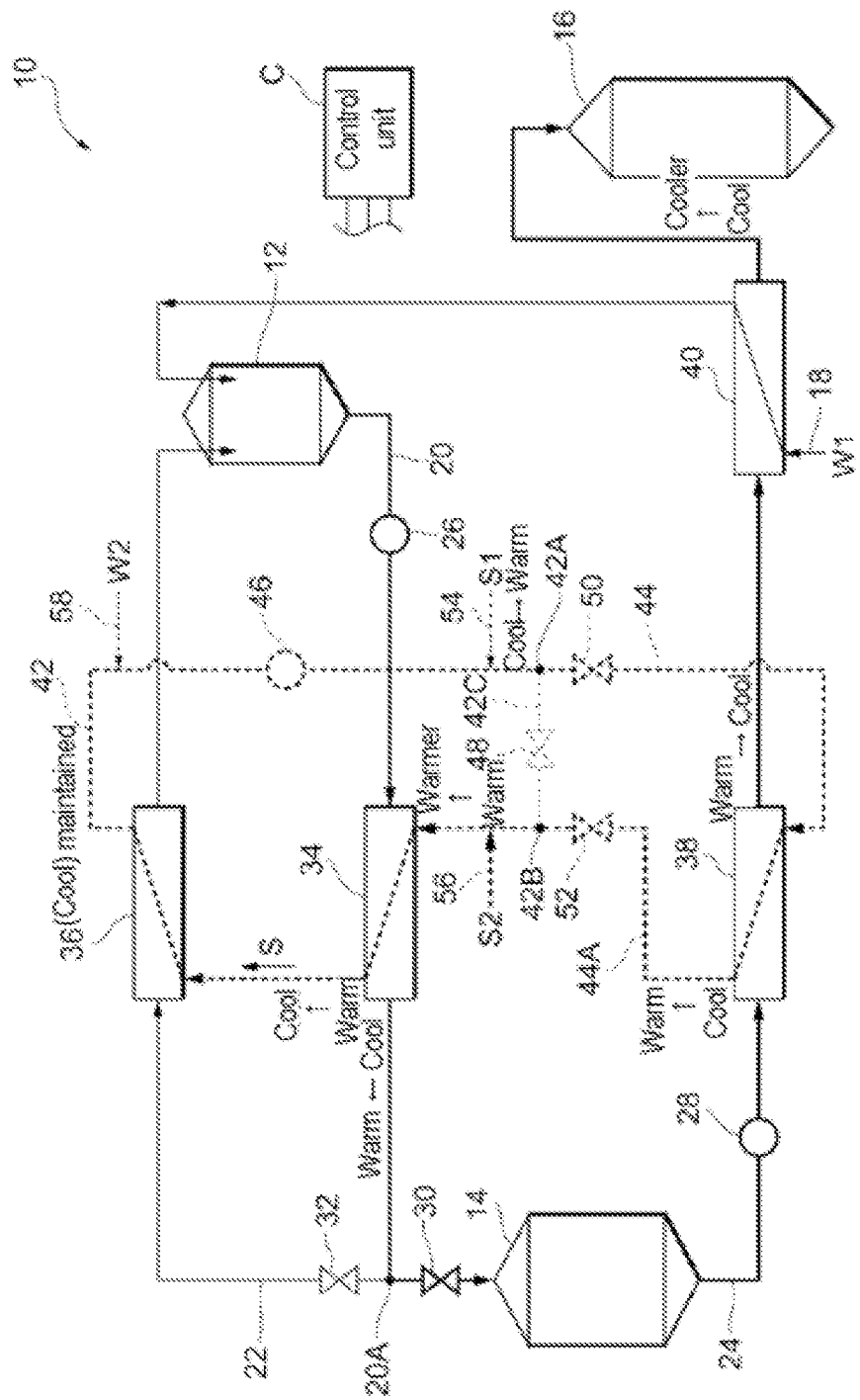
[Fig. 6]

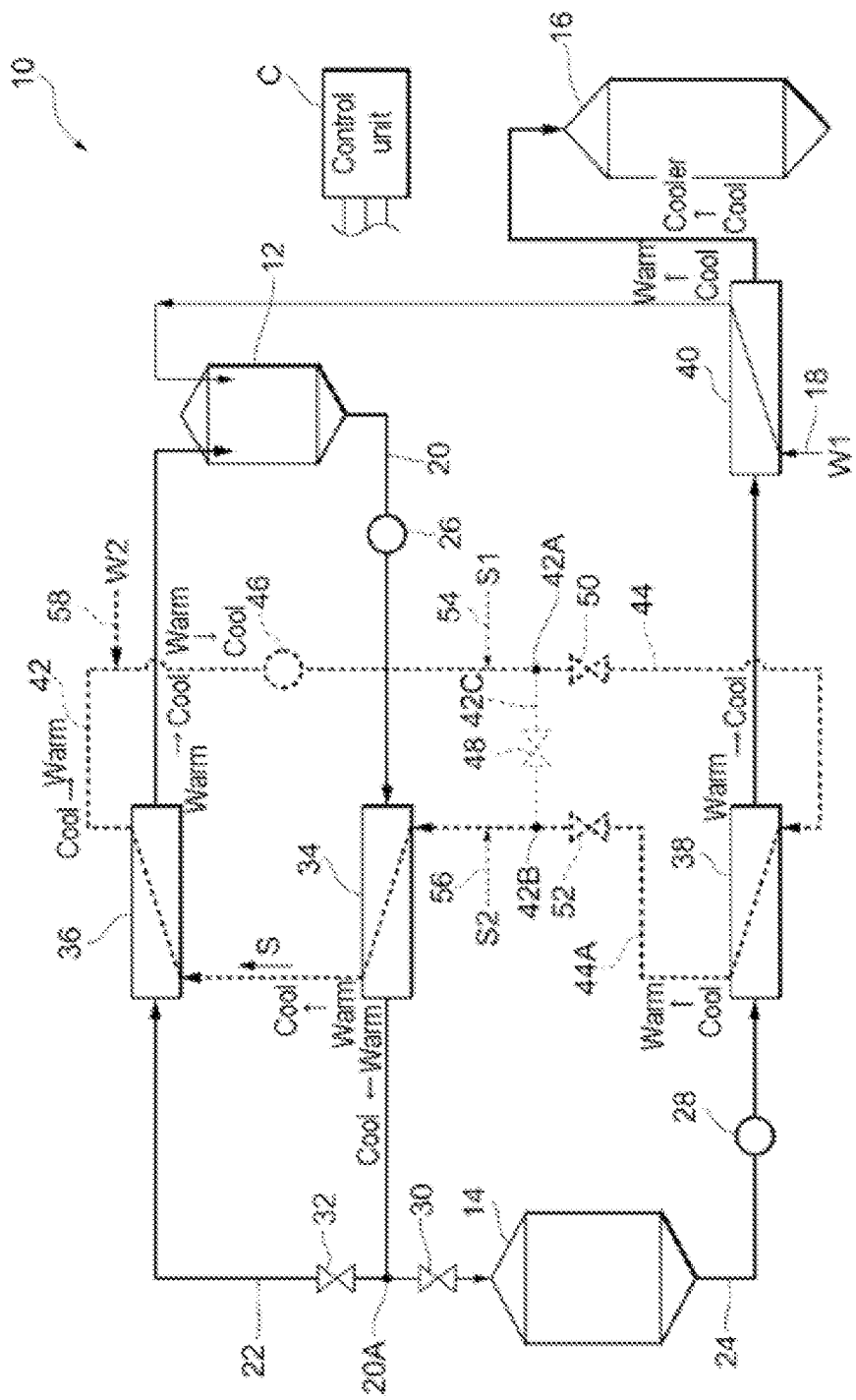
[Fig. 7]

EXTRACT PRODUCTION SYSTEM AND METHOD FOR PRODUCING EXTRACT

TECHNICAL FIELD

The present application relates to an extract production system and a method for producing an extract.

BACKGROUND ART

Extract production systems for extracting an extract from a starting material by using a solvent flowing into the interior thereof are known from the prior art.

In this regard, Patent Document 1 indicates that before an extract is extracted, a heat exchanger and a heat exchange medium thereof are used to heat warm water (solvent) to a predetermined temperature.

PRIOR ART DOCUMENT

Patent Document

Patent Document 1: JP 9-252712 A

DISCLOSURE OF THE INVENTION

Problem to be Solved by the Invention

In this kind of extract production system, the solvent sometimes undergoes further heat exchange with the aim of bringing the temperature thereof close to the abovementioned predetermined temperature, among other things, by using a separate heat exchanger (e.g., a cooling tower) and a separate heat exchange medium.

In this case, however, a large amount of the heat exchange medium is consumed and there is an increase in the extract production cost.

The present application has been devised in light of this situation, and one aim thereof lies in providing an extract production apparatus and a method for producing an extract, which make it possible to reduce the consumption amount of heat exchange medium used for heat exchange.

Means for Solving the Problem

An extract production system according to a first mode of the present invention includes: an extraction unit for extracting an extract from a starting material by using a solvent flowing into the interior thereof; a first heat exchange unit for subjecting the solvent flowing into the extraction unit to heat exchange by using a heat exchange medium; and a second heat exchange unit for subjecting the solvent which underwent heat exchange in the first heat exchange unit to heat exchange by reusing the heat exchange medium which underwent heat exchange in the first heat exchange unit.

By virtue of this configuration, the second heat exchange unit performs heat exchange by reusing the heat exchange medium which underwent heat exchange in the first heat exchange unit, so it is possible to reduce the amount of newly-introduced heat exchange medium used for heat exchange in the second heat exchange unit, and it is thereby possible to reduce the consumption amount of heat exchange medium used for heat exchange.

In an extract production system according to a second mode of the present invention, which is in accordance with the first mode, the first heat exchange unit reuses the heat exchange medium which underwent heat exchange in the second heat exchange unit as the heat exchange medium used for the abovementioned heat exchange.

According to the abovementioned configuration, the first heat exchange unit reuses the heat exchange medium which underwent heat exchange in the second heat exchange unit, so it is possible to reduce the amount of newly-introduced heat exchange medium used for heat exchange in the first heat exchange unit while it is also possible to reduce the amount of heat exchange medium for heat exchange in the second heat exchange unit, and it is thereby possible to further reduce the consumption amount of heat exchange medium used for heat exchange.

An extract production system according to a third mode of the present invention, which is in accordance with the first or second mode, further includes a third heat exchange unit for subjecting the extract extracted by the extraction unit to heat exchange by reusing the heat exchange medium which underwent heat exchange in the first heat exchange unit.

According to the abovementioned configuration, the third heat exchange unit performs heat exchange by reusing the heat exchange medium which underwent heat exchange in the first heat exchange unit, so it is possible to reduce the amount of newly-introduced heat exchange medium used for heat exchange in the third heat exchange unit, and it is thereby possible to further reduce the consumption amount of heat exchange medium used for heat exchange.

In an extract production system according to a fourth mode of the present invention, which is in accordance with the third mode, the first heat exchange unit reuses the heat exchange medium which underwent heat exchange in the third heat exchange unit as the heat exchange medium used for the abovementioned heat exchange.

According to the abovementioned configuration, the first heat exchange unit reuses the heat exchange medium which underwent heat exchange in the third heat exchange unit, so it is possible to reduce the amount of newly-introduced heat exchange medium used for heat exchange in the first heat exchange unit, and it is thereby possible to further reduce the consumption amount of heat exchange medium used for heat exchange.

An extract production system according to a fifth mode of the present invention, which is in accordance with the third or fourth mode, further includes: a first circulation flow path for circulating the heat exchange medium between the first heat exchange unit and the second heat exchange unit; a second circulation flow path for circulating the heat exchange medium between the first heat exchange unit, the second heat exchange unit and the third heat exchange unit; and a flow path switching unit for switching the flow path that circulates the heat exchange medium to either the first circulation flow path or the second circulation flow path.

According to the abovementioned configuration, the flow path switching unit switches the flow path that circulates the heat exchange medium to either the first circulation flow path or the second circulation flow path, and as a result it is possible to switch whether or not heat exchange is performed in relation to the extract, and heat exchange can be efficiently performed.

An extract production system according to a sixth mode of the present invention, which is in accordance with the fifth mode, includes: a first introduction unit which is provided upstream of the first heat exchange unit in a circulation flow path including the first circulation flow path and the second circulation flow path, and introduces the heat exchange medium into the circulation flow path; a second introduction unit which is provided in a different location from the first introduction unit, upstream of the first heat exchange unit in the circulation flow path, and introduces the heat exchange medium into the circulation flow path; and an adjustment unit for adjusting the amount of the heat exchange medium introduced from the first introduction unit and the second introduction unit.

According to the abovementioned configuration, the adjustment unit adjusts the amount of heat exchange medium introduced from the first introduction unit and the second introduction unit, so the range of adjustment is increased and heat exchange can be performed more efficiently than when the amount of heat exchange medium introduced is adjusted in only the first introduction unit.

An extract production system according to a seventh mode of the present invention, which is in accordance with any one of the first to sixth modes, further includes: a solvent storage unit for storing the solvent; a solvent supply flow path which connects the solvent storage unit and the extraction unit, has the first heat exchange unit disposed along the connection, and causes the solvent stored in the solvent storage unit to flow to the extraction unit; and a solvent return flow path which branches from the solvent supply flow path downstream of the first heat exchange unit to connect the solvent supply flow path and the solvent storage unit, has the second heat exchange unit disposed along the connection, and returns the solvent which underwent heat exchange in the first heat exchange unit to the solvent storage unit.

According to the abovementioned configuration, the solvent can be circulated between the solvent storage unit, the solvent supply flow path and the solvent return flow path, and repeatedly subjected to heat exchange in the first heat exchange unit and the second heat exchange unit along said flow paths. As a result, it is possible to set the temperature of the solvent at the optimum temperature for extraction by the extraction unit.

A method for producing an extract according to an eighth mode of the present invention includes: an extraction step in which an extract is extracted from a starting material by using a solvent flowing into the interior thereof; a first heat exchange step in which the solvent flowing into the extraction unit is subjected to heat exchange by using a heat exchange medium; and a second heat exchange step in which the solvent which underwent heat exchange in the first heat exchange step is subjected to heat exchange by reusing the heat exchange medium which underwent heat exchange in the first heat exchange unit.

According to this production method, the second heat exchange step performs heat exchange by reusing the heat exchange medium which underwent heat exchange in the first heat exchange step, so it is possible to reduce the amount of newly-introduced heat exchange medium used for heat exchange in the second heat exchange step, and it is thereby possible to reduce the consumption amount of heat exchange medium used for heat exchange.

Advantage of the Invention

According to the present invention, it is possible to reduce the consumption amount of heat exchange medium used for heat exchange.

BRIEF DESCRIPTION OF THE DRAWINGS

FIG. 1 is a schematic diagram to illustrate the configuration of an extract production system according to a mode of embodiment of the present invention;

FIG. 2 is a flowchart to illustrate a series of production steps in a method for producing an extract according to a mode of embodiment of the present invention;

FIG. 3 is an explanatory diagram to illustrate a warm water preparation step in the method for producing an extract according to a mode of embodiment of the present invention;

FIG. 4 is an explanatory diagram to illustrate an extraction preparation step in the method for producing an extract according to a mode of embodiment of the present invention;

FIG. 5 is an explanatory diagram to illustrate an extraction start step in the method for producing an extract according to a mode of embodiment of the present invention;

FIG. 6 is an explanatory diagram to illustrate an extraction continuation step in the method for producing an extract according to a mode of embodiment of the present invention; and FIG. 7 is an explanatory diagram to illustrate an extract extraction termination preparation and warm water preparation step according to a mode of embodiment of the present invention.

MODE OF EMBODIMENT OF THE INVENTION

A preferred mode of embodiment of the present invention will be described below with reference to the drawings. It should be noted that the same reference symbols are used for elements which are the same, and a duplicate description will not be given. Furthermore, unless indicated otherwise, the positional relationships such as above, below, left and right etc. are based on the positional relationships depicted in the drawings. In addition, the dimensional proportions in the drawings are not limited to those depicted. Furthermore, the following mode of embodiment is an example to illustrate the present invention, and the present invention is not limited to this mode of embodiment.

Extract Production System

The outline of an extract production system according to a mode of embodiment of the present invention will be described first of all. FIG. 1 is a schematic diagram to illustrate the configuration of the extract production system according to a mode of embodiment of the present invention.

As shown in FIG. 1, an extract production system 10 includes: a warm water storage tank 12, an extractor 14, an extract storage tank 16, and a control unit C.

The warm water storage tank 12 is a solvent storage unit for storing warm water serving as a solvent used when the extractor 14 performs extraction.

The extractor 14 is an extraction unit for extracting an extract from a starting material by using warm water flowing into the interior thereof from the warm water storage tank 12. Specifically, the starting material is disposed on a filter and warm water is poured onto the starting material from a shower nozzle, whereby the extractor 14 extracts an extract from the starting material through the filter. Examples of starting materials which may be cited include plant starting materials for beverages, such as coffee beans or tea leaves. Furthermore, examples of extracts which may be cited include beverages, beverage starting materials which are diluted for use in beverages, and beverage concentrates which are diluted for use in beverages.

The extract storage tank 16 is an extract storage unit for storing the extract extracted from the extractor 14.

The control unit C performs various aspects of control of the extract production system 10, including control of the extractor 14.

The extract production system 10 configured in the manner described above includes a warm water addition flow path 18, a warm water supply flow path 20, a warm water return flow path 22, and an extract recovery flow path 24, which connect the structural components.

Specifically, the warm water addition flow path 18 is a flow path which connects a supply source (not depicted) for cold water W1 from which warm water is generated, and the warm water storage tank 12. Warm water, which is obtained as a result of the cold water W1 being warmed along the warm water addition flow path 18, is made to flow through said warm water addition flow path 18 to the warm water storage tank 12 by means of a pump which is not depicted. As a result, additional warm water is stored in the warm water storage tank 12.

The warm water supply flow path 20 is a flow path connecting the warm water storage tank 12 and the extractor 14. The warm water stored in the warm water storage tank 12 is made to flow through (supplied to) the warm water supply flow path 20 to the extractor 14 using a pump 26. As a result, warm water flows into the interior of the extractor 14.

The warm water return flow path 22 is a flow path which branches at a branch point 20A along the warm water supply flow path 20 to connect the warm water supply flow path 20 and the warm water storage tank 12. The warm water return flow path 22 returns the warm water flowing through the warm water supply flow path 20 to the warm water storage tank 12 using the pump 26.

The extract recovery flow path 24 is a flow path connecting the extractor 14 and the extract storage tank 16. The extract extracted by the extractor 14 is made to flow through the extract recovery flow path 24 to the extract storage tank 16 using a pump 28. As a result, the extract is stored in the extract storage tank 16.

In the warm water flow paths such as described above, the extract production system 10 includes, in addition to the abovementioned pumps 26, 28: valves 30, 32, a first heat exchanger 34, a second heat exchanger 36, a third heat exchanger 38, and a fourth heat exchanger 40.

Specifically, the valve 30 is disposed downstream of the branch point 20A in the warm water supply flow path 20. Furthermore, the valve 32 is disposed upstream close to the branch point 20A in the warm water return flow path 22. The valves 30, 32 switch the inflow destination of the warm water flowing through the warm water supply flow path 20 to either the extractor 14 or the warm water storage tank 12, in accordance with a command from the control unit C.

The first heat exchanger 34 is disposed upstream of the branch point 20A in the warm water supply flow path 20. The first heat exchanger 34 performs heat exchange with the warm water flowing into the extractor 14 in the warm water supply flow path 20, using steam S as a heat exchange medium. Here, according to this mode of embodiment, it is assumed that the warm water stored in the warm water storage tank 12 is at a temperature of less than 100 degrees, for example. In this case, the first heat exchanger 34 heats the warm water to a suitable temperature which is equal to or greater than 100 degrees (referred to below as the "target extraction temperature"), for example, in such a way that the extract is efficiently extracted by the extractor 14. The steam S is cooled as a result of this heat exchange. It should be noted that the steam S may pass through a heating step afforded by steam S1 and may pass through a heating step afforded by the steam S1 and steam S2. Furthermore, the temperature of the steam S before heat exchange in the first heat exchanger 34 is adjusted to between 100 and 150 degrees, for example.

The second heat exchange unit 36 is disposed downstream of the valve 32 in the warm water return flow path 22. The second heat exchange unit 36 cools the warm water heated by the first heat exchanger 34 and returning to the warm water storage tank 12 through the warm water return flow path 22, by reusing the steam S cooled in the first heat exchange unit 34. The reused steam S is heated as a result of this heat exchange. The steam S heated in the second heat exchange unit 36 is further reused as part or all of the steam used for heat exchange by the first heat exchange unit 34. As will be described in detail later, heating and cooling are repeatedly performed by the first heat exchanger 34 and the second heat exchange unit 36, whereby it is possible to reduce the amount of heat exchange medium (steam for heating, cold water for cooling, etc.) used for the warm water flowing into the extractor 14.

The third heat exchanger 38 is disposed along the extract recovery flow path 24. The third heat exchanger 38 cools the extract extracted by the extractor 14 and flowing to the extract storage tank 16, by reusing the steam S cooled in the first heat exchanger 34. The reused steam S is heated as a result of this heat exchange. The steam S heated in the third heat exchanger 38 is further reused as part or all of the heating medium used for heat exchange by the first heat exchange unit 34.

The fourth heat exchanger 40 is disposed downstream of the third heat exchanger 38 in the extract recovery flow path 24. The fourth heat exchanger 40 further cools the extract cooled in the third heat exchanger 38 and flowing to the extract storage tank 16, by using the cold water W1. As a result, the extract cooled to 50 degrees or less, for example, by means of the third heat exchanger 38 and the fourth heat exchanger 40 is stored in the extract storage tank 16. Furthermore, the used cold water W1 is heated to form warm water as a result of heat exchange in the fourth heat exchanger 40. This warm water flows into the warm water storage tank 12 via the warm water addition flow path 18. That is to say, this warm water is reused for extraction by means of the extractor 14.

The extract production system 10 includes, as a configuration for reusing the steam S in this way, a circulation flow path for the steam S, including a first circulation flow path 42 and a second circulation flow path 44. It should be noted that in FIG. 1 and onward, this circulation flow path is represented by a dotted line in order to distinguish it from the flow paths for warm water and extract.

The first circulation flow path 42 is a flow path which forms a circulating connection between the first heat exchange unit 34 and the second heat exchange unit 36 (see the thick dotted line in FIG. 3). In the first circulation flow path 42, the steam S is circulated between the first heat exchange unit 34 and the second heat exchange unit 36 using a pump 46. Moreover, a branch point 42A and a branch point 42B are disposed upstream of the first heat exchange unit 34 and downstream of the second heat exchange unit 36 in the first circulation flow path 42.

The second circulation flow path 44 is a flow path which forms a circulating connection between the first heat exchange unit 34, the second heat exchange unit 36, and the second heat exchange unit 36 (see the thick dotted line in FIG. 4). The second circulation flow path 44 includes: the first circulation flow path 42, excluding a flow path 42C where the first heat exchange unit 34, etc. is not disposed, between the branch point 42A and the branch point 42B; and a flow path 44A which branches from the branch point 42A of the first circulation flow path 42 to connect to the branch point 42B. In the second circulation flow path 44, the steam S is circulated between the first heat exchange unit 34, the second heat exchange unit 36, and the third heat exchanger 38, by using the pump 46.

The extract production system 10 includes, in these flow paths for the steam S: valves 48, 50, 52; a first introduction port 54; a second introduction port 56; and a water introduction port 58.

The valve 48 is disposed in the flow path 42C between the branch point 42A and the branch point 42B. The valve 50 is disposed between the third heat exchanger 38 and the branch point 42A in the second circulation flow path 44. The valve 52 is disposed between the third heat exchanger 38 and the branch point 42B in the second circulation flow path 44. The valves 48, 50, 52 switch the flow path through which the steam S is circulated to either the first circulation flow path 42 or the second circulation flow path 44, in accordance with a command from the control unit C. That is to say, the valves 48, 50, 52 and the control unit C form the flow path switching unit according to this mode of embodiment.

The first introduction port 54 is disposed upstream of the first heat exchange unit 34 and downstream of the second heat exchange unit 36 in the first circulation flow path 42. Specifically, the first introduction port 54 is disposed between the second heat exchange unit 36 and the branch point 42A in the first circulation flow path 42. The first introduction port 54 introduces the steam S1 into the circulation flow path including the first circulation flow path 42 and the second circulation flow path 44. As a result, the steam S1 forms part of the steam S flowing through the circulation flow path.

The second introduction port 56 is disposed in a different location from the first introduction port 54, upstream of the first heat exchange unit 34 and downstream of the second heat exchange unit 36 in the first circulation flow path 42. Specifically, the second introduction port 56 is disposed between the first heat exchange unit 34 and the branch point 42B in the first circulation flow path 42. The second introduction port 56 introduces the steam S2 into the circulation flow path including the first circulation flow path 42 and the second circulation flow path 44. As a result, the steam S2 forms part of the steam S flowing through the circulation flow path.

It should be noted that the amount of steam S1, S2 introduced from the first introduction port 54 and the second introduction port 56 is adjusted by means of the control unit C.

The water introduction port 58 is disposed upstream of the first heat exchange unit 34 and downstream of the second heat exchange unit 36 in the first circulation flow path 42. The water introduction port 58 introduces cold water W2 into the first circulation flow path 42.

Method for Producing an Extract

The method for producing an extract which is performed by the abovementioned extract production system 10 will be described next. FIG. 2 is a flowchart to illustrate a series of production steps in the method for producing an extract according to a mode of embodiment of the present invention.

Furthermore, FIG. 3 is an explanatory diagram to illustrate a warm water preparation step in the method for producing an extract according to a mode of embodiment of the present invention. FIG. 4 is an explanatory diagram to illustrate an extraction preparation step in the method for producing an extract according to a mode of embodiment of the present invention. FIG. 5 is an explanatory diagram to illustrate an extraction start step in the method for producing an extract according to a mode of embodiment of the present invention. FIG. 6 is an explanatory diagram to illustrate an extraction continuation step in the method for producing an extract according to a mode of embodiment of the present invention. FIG. 7 is an explanatory diagram to illustrate an extract extraction termination preparation and warm water preparation step according to a mode of embodiment of the present invention.

It should be noted that from FIG. 3 onward, the flow paths and introduction ports, etc. used in each step are represented by thick lines. Furthermore, from FIG. 3 onward, the temperature of the warm water, etc. is represented by (cool) or (warm), etc. The (cool) and (warm) denote the relative temperatures when compared before and after heat exchange. In the designation (cool)→(warm), for example, (cool) is a cooler temperature than after heat exchange, and (warm) is a warmer temperature than before heat exchange. Furthermore, the following description relates to a case in which all of the production steps are performed by the control unit C, but some or all of the production steps may equally be performed by a person.

Step SP10

The control unit C first of all implements the warm water preparation step, in which the warm water is prepared in order to set the warm water for supply to the extractor 14 at the target extraction temperature.

Specifically, as shown in FIG. 3, the control unit C controls the valves 30, 32 so as to close the valve 30 and to open the valve 32. Furthermore, the control unit C controls the valves 48, 50, 52 so as to close the valves 50, 52 and to open the valve 48. After this, the control unit C controls a valve which is not depicted so that the steam S1 at the target extraction temperature is introduced from the first introduction port 54. The control unit C then controls the pump 46 so as to produce a flow of the steam S which was introduced. Furthermore, the control unit C controls the pump 26 so that warm water at a temperature of less than 100 degrees, for example, stored in the warm water storage tank 12 flows to the warm water supply flow path 20.

As a result, the warm water stored in the warm water storage tank 12 is circulated between the warm water supply flow path 20, the warm water return flow path 22, and the warm water storage tank 12. Furthermore, the flow path for the steam S is switched to the first circulation flow path 42. The steam S1 from the first introduction port 54 is then introduced as a heating medium and the steam S circulates in the first circulation flow path 42.

Here, the warm water flowing through the warm water supply flow path 20 is heated by heat exchange with the steam S in the first heat exchanger 34 along said warm water supply flow path 20 (first heat exchange step). That is to say, the temperature of said warm water changes from a cool temperature to a warm temperature before and after the first heat exchanger 34 {(cool)→(warm) in FIG. 3}. Meanwhile, the steam S flowing to the first circulation flow path 42 is cooled by heat exchange with the warm water in the first heat exchanger 34. That is to say, the temperature of said steam S changes from a warm temperature to a cool temperature before and after the first heat exchanger 34 {(warm)→(cool) in FIG. 3}.

Furthermore, the warm water which is heated in the first heat exchanger 34 and flows to the warm water return flow path 22 is cooled by heat exchange in the second heat exchanger 36 along said warm water return flow path 22 with the steam S cooled in the first heat exchange unit 34, by reuse of said steam (second heat exchange step). That is to say, the temperature of said warm water changes from a warm temperature to a cool temperature before and after the second heat exchanger 36 {(warm)→(cool) in FIG. 3}. Meanwhile, the steam S cooled in the first heat exchanger 34 and flowing to the first circulation flow path 42 is heated by heat exchange in the second heat exchanger 36 with the warm water heated in the first heat exchanger 34. That is to say, the temperature of said steam S changes from a cool temperature to a warm temperature before and after the second heat exchanger 36 {(cool)→(warm) in FIG. 3}.

Furthermore, the warm water which has returned from the warm water return flow path 22 to the warm water storage tank 12 once again flows through the water supply flow path 20. Said warm water is then heated by heat exchange in the first heat exchanger 34 along said warm water supply flow path 20 with the steam S heated in the second heat exchanger 36, by reuse of said steam S. In other words, the temperature of said warm water changes from a cool temperature to a warm temperature before and after the first heat exchanger 34 {(cool)→(warm) in FIG. 3}. Meanwhile, the steam S which has been heated in the second heat exchanger 36 and flows to the first circulation flow path 42 is cooled by heat exchange with the warm water in the first heat exchanger 34. That is to say, the temperature of said steam S changes from a warm temperature to a cool temperature before and after the first heat exchanger 34 {(warm)→(cool) in FIG. 3}.

It should be noted that when the warm water once again flows in this way through the warm water supply flow path 20, the temperature of the steam S heated in the second heat exchanger 36 may be less than the target extraction temperature. In this case, the control unit C introduces additional steam S1 in a smaller amount than the initial introduction amount, as part of the steam S, from the first introduction port 54 to the first circulation flow path 42, in such a way that the temperature of said steam S reaches the target extraction temperature. As a result, the temperature of the steam S flowing toward the first heat exchanger 34 changes from a warm temperature to a warmer temperature before and after the first introduction port 54 {(warm)→(warmer) in FIG. 3}.

In the abovementioned warm water preparation step, the control unit C repeats heat exchange while circulating the warm water until the temperature of the warm water reaches the target extraction temperature. The series of production steps then shifts to the step of SP12 shown in FIG. 2.

Step SP12

The control unit C implements the extraction preparation step, in which extraction by the extractor 14 is prepared.

Specifically, as shown in FIG. 4, the control unit C controls the valves 30, 32 so as to open the valve 30 and to close the valve 32. It should be noted that the control unit C maintains a state in which the valves 50, 52 are closed and the valve 48 is open. Furthermore, the control unit C continues control of the pumps 26, 46. Furthermore, the control unit C controls a valve which is not depicted so that steam S1 in an equal amount to the initial introduction amount is introduced from the first introduction port 54.

As a result, the warm water which has circulated through the warm water supply flow path 20 and the warm water return flow path 22 flows from the warm water supply flow path 20 to the extractor 14. Furthermore, the steam S1 from the first introduction port 54 circulates through the first circulation flow path 42 as the steam S.

Here, the warm water flowing through the warm water supply flow path 20 is heated by heat exchange with the steam S in the first heat exchanger 34 along said warm water supply flow path 20. That is to say, the temperature of said warm water changes from a cool temperature to a warm temperature before and after the first heat exchanger 34 {(cool)→(warm) in FIG. 4}. Meanwhile, the steam S flowing to the first circulation flow path 42 is cooled by heat exchange with the warm water in the first heat exchanger 34. That is to say, the temperature of said steam S changes from a warm temperature to a cool temperature before and after the first heat exchanger 34 {(warm)→(cool) in FIG. 4}.

Furthermore, the temperature of the warm water heated in the first heat exchanger 34 reaches the target extraction temperature, and said warm water flows to the extractor 14. Meanwhile, the steam S cooled in the first heat exchanger 34 and flowing to the first circulation flow path 42 passes through the second heat exchanger 36, but the warm water which is subject to heat exchange does not flow thereto so heat exchange does not take place in said second heat exchanger 36, and said steam S once again flows toward the first heat exchanger 34. That is to say, the temperature of said steam S is maintained at a cool temperature before and after the second heat exchanger 36 {(cool) maintained in FIG. 4}.

It should be noted that the steam S maintained in a cool temperature state must be raised to the target extraction temperature because it heats the warm water to the target extraction temperature in the first heat exchanger 34. The control unit C therefore introduces additional steam S1 in an equal amount to the initial introduction amount into the first circulation flow path 42 as part of the steam S, in such a way that the temperature of said steam S reaches the target extraction temperature. Furthermore, the temperature of the steam S falls suddenly to a cooler temperature than in the abovementioned warm water preparation step, so the control unit C supplements this accordingly by introducing additional steam S2 into the first circulation flow path 42 as part of an additional heating step.

As a result, the temperature of the steam S flowing to the first circulation flow path 42 changes from a cool temperature to a warm temperature before and after the first introduction port 54 {(cool)→(warm) in FIG. 4}. Furthermore, the temperature of the steam S then changes from a warm temperature to a warmer temperature before and after the second introduction port 56 {(warm)→(warmer) in FIG. 4}.

When the abovementioned extraction preparation step has ended, the series of production steps shifts to the step of SP14 shown in FIG. 2.

Step SP14

The control unit C implements the extraction start step, in which extraction is performed by the extractor 14.

Specifically, as shown in FIG. 5, the control unit C maintains a state in which the valves 32, 50, 52 are closed and the valves 30, 48 are open. Furthermore, the control unit C continues to introduce the steam S1, S2. Furthermore, the control unit C continues control of the pumps 26, 46. Furthermore, the control unit C controls the extractor 14 so as to start extraction of the extract using the warm water at the target extraction temperature flowing into the interior thereof. Furthermore, the control unit C newly controls the pump 28 so that the extract extracted by the extractor 14 flows to the extract recovery flow path 24.

As a result, the warm water stored in the water storage tank 12 flows from the warm water supply flow path 20 to the extractor 14. Furthermore, the extract extracted by the extractor 14 flows through the extract recovery flow path 24, after which it flows to the extract storage tank 16 where it is recovered. Furthermore, the steam S1, S2 circulates through the first circulation flow path 42 as the steam S.

Here, the warm water flowing through the warm water supply flow path 20 is heated by heat exchange with the steam S in the first heat exchanger 34 along said warm water supply flow path 20. That is to say, the temperature of said warm water changes from a cool temperature to a warm temperature before and after the first heat exchanger 34 {(cool)→(warm) in FIG. 5}. Meanwhile, the steam S flowing to the first circulation flow path 42 is cooled by heat exchange with the warm water in the first heat exchanger 34. That is to say, the temperature of said steam S changes from a warm temperature to a cool temperature before and after the first heat exchanger 34 {(warm)→(cool) in FIG. 5}.

Furthermore, the steam S cooled in the first heat exchanger 34 and flowing to the first circulation flow path 42 passes through the second heat exchanger 36, but the warm water which is subject to heat exchange does not flow thereto so heat exchange does not take place in said second heat exchanger 36, and said steam S once again flows toward the first heat exchanger 34. That is to say, the temperature of said steam S is maintained at a cool temperature before and after the second heat exchanger 36 {(cool) maintained in FIG. 5}.

Furthermore, the temperature of the extract flowing through the extract recovery flow path 24 is well below the temperature of the warm water at the start of extraction. The extract passes through the third heat exchanger 38, but the steam S which is subject to heat exchange does not flow thereto so heat exchange does not take place in said third heat exchanger 38, and said extract flows toward the extract storage tank 16. That is to say, the extract is maintained at a cool temperature before and after the third heat exchanger 38 {(cool) maintained in FIG. 5}. The extract which has passed through the third heat exchanger 38 is cooled by heat exchange with the cold water W1 in the fourth heat exchanger 40. That is to say, said extract changes from a cool temperature to a cooler temperature before and after the fourth heat exchanger 40 {(cool)→(cooler) in FIG. 5}. Meanwhile, the cold water W1 is heated by heat exchange with the extract in the fourth heat exchanger 40. That is to say, the cold water W1 forms warm water that has changed from a cool temperature to a warm temperature before and after the fourth heat exchanger 40 {(cool)→(warm) in FIG. 5}. It should be noted that this warm water flows through the warm water addition flow path 18 and is supplied to the warm water storage tank 12.

After the abovementioned extraction start step, the extract flowing through the extract recovery flow path 24 is gradually warmed toward the temperature of the warm water. When the extract becomes warmer than a predetermined temperature (e.g., 90 degrees or greater), said extract must be even further cooled before recovery in the extract storage tank 16, so the series of production steps shifts to the step of SP16 shown in FIG. 2.

Step SP16

The control unit C implements the extraction continuation step in which extraction by the extractor 14 is continued.

Specifically, as shown in FIG. 6, the control unit C maintains a state in which the valve 32 is closed and the valve 30 is open. Furthermore, the control unit C continues control of the pumps 26, 28, 46. Furthermore, the control unit C controls the extractor 14 so as to continue extraction of the extract using the hot water at the target extraction temperature flowing into the interior thereof.

In addition, the control unit C controls the valves 48-52 so as to open the valves 50, 52 and to close the valve 48. Furthermore, the control unit C continues introduction of the steam S2 but stops introduction of the steam S1. It should be noted that in order to avoid a sudden stoppage, the control unit C preferably adjusts each introduction amount in the previous extraction start step, in such a way that the amount of steam S1 introduced is gradually reduced while the amount of steam S2 introduced is gradually increased.

As a result, the warm water stored in the warm water storage tank 12 flows from the warm water supply flow path 20 to the extractor 14. Furthermore, the extract extracted by the extractor 14 flows through the extract recovery flow path 24, after which it flows to the extract storage tank 16 where it is recovered. Furthermore, the flow path for the steam S is switched to the second circulation flow path 44. The steam S2 then circulates through the second circulation flow path 44 as the steam S. That is to say, the control unit C switches the flow path circulating the steam S to the second circulation flow path 44 in accordance with the temperature of the extract.

Here, the warm water flowing through the warm water supply flow path 20 is heated by heat exchange with the steam S in the first heat exchanger 34 along said warm water supply flow path 20. The temperature of said warm water changes from a cool temperature to a warm temperature before and after the first heat exchanger 34 {(cool)→(warm) in FIG. 6}. Meanwhile, the steam S flowing to the second circulation flow path 44 is cooled by heat exchange with the warm water in the first heat exchanger 34. That is to say, the temperature of said steam S changes from a warm temperature to a cool temperature before and after the first heat exchanger 34 {(warm)→(cool) in FIG. 6}.

Furthermore, the steam S cooled in the first heat exchanger 34 and flowing to the first circulation flow path 42 passes through the second heat exchanger 36, but the warm water which is subject to heat exchange does not flow thereto so heat exchange does not take place in said second heat exchanger 36, and said steam S flows toward the third heat exchanger 38. That is to say, the temperature of said steam S is maintained at a cool temperature before and after the second heat exchanger 36 {(cool) maintained in FIG. 6}.

Furthermore, the extract flowing through the extract recovery flow path 24 is a warm material in the extraction continuation step (from the middle period of extraction and onward). This extract is cooled by heat exchange in the third heat exchanger 38 along the extract recovery flow path 24 with the steam S cooled in the first heat exchanger 34, by reuse of said steam S. That is to say, the temperature of said extract changes from a warm temperature to a cool temperature before and after the third heat exchanger 38 {(warm)→(cool) in FIG. 6}. Meanwhile, the steam S cooled in the first heat exchanger 34 (the steam maintained at a cool temperature in the second heat exchanger 36) is heated by heat exchange with the extract in the third heat exchanger 38. That is to say, the temperature of said steam S changes from a cool temperature to a warm temperature before and after the third heat exchanger 38 {(cool)→(warm) in FIG. 6}.

Furthermore, the extract cooled in the third heat exchanger 38 is further cooled by heat exchange with the cold water W1 in the fourth heat exchanger 40. That is to say, the temperature of said extract changes from a cool temperature to a cooler temperature before and after the fourth heat exchanger 40 {(cool)→(cooler) in FIG. 6}. Meanwhile, the cold water W1 is heated by heat exchange with the extract in the fourth heat exchanger 40. That is to say, said cold water W1 forms warm water that has changed from a cool temperature to a warm temperature before and after the fourth heat exchanger 40 {(cool)→(warm) in FIG. 6}.

Furthermore, the steam S that has reached a warm temperature in the third heat exchanger 38 is further heated by introduction of the steam S2. That is to say, the temperature of said steam S changes from a warm temperature to a warmer temperature before and after the second introduction port 56 for the steam S2 {(warm)→(warmer) in FIG. 6}.

The abovementioned extraction continuation step is continued until a predetermined time, for example, has elapsed from the start of the extraction continuation step. Moreover, during this continuation, the temperature of the extract immediately after the extractor 14 gradually rises, so the control unit C gradually reduces the amount of steam S2 introduced. After the abovementioned predetermined time has elapsed, the series of production steps shifts to the step of SP18 shown in FIG. 2.

Step SP18

The control unit C makes preparations to terminate extraction by the extractor 14, and implements an extraction termination preparation and warm water preparation step in order to prepare warm water for extracting an extract from another different starting material or the like after the series of production steps.

Specifically, as shown in FIG. 7, the control unit C controls the valves 30, 32 so as to close the valve 30 and to open the valve 32. Furthermore, the control unit C maintains a state in which the valves 50, 52 are open and the valve 48 is closed. Furthermore, the control unit C continues control of the pumps 26, 28, 46.

In addition, the control unit C controls the extractor 14 so that extraction of the extract is continued until a predetermined period has elapsed after warm water has stopped flowing into the interior thereof, after which extraction is terminated. Furthermore, the control unit C stops the introduction of the steam S2. Furthermore, the control unit C introduces the cold water W2 from the water introduction port 58 to the second recirculation flow path 44.

As a result, the warm water stored in the warm water storage tank 12 circulates between the water supply flow path 20, the warm water return flow path 22, and the warm water storage tank 12. Furthermore, the extract extracted by the extractor 14 until extraction is terminated flows through the extract recovery flow path 24, after which it flows to the extract storage tank 16 where it is recovered. Furthermore, the steam S circulates through the second circulation flow path 44.

Here, the warm water flowing through the warm water supply flow path 20 is heated by heat exchange with the steam S in the first heat exchanger 34 along said warm water supply flow path 20. That is to say, the temperature of said warm water changes from a cool temperature to a warm temperature before and after the first heat exchanger 34 {(cool)→(warm) in FIG. 7}. Meanwhile, the steam S flowing to the second circulation flow path 44 is cooled by heat exchange with the warm water in the first heat exchanger 34. That is to say, the temperature of said steam S changes from a warm temperature to a cool temperature before and after the first heat exchanger 34 {(warm)→(cool) in FIG. 7}.

Furthermore, the water heated in the first heat exchanger 34 and flowing to the warm water return flow path 22 is cooled by heat exchange in the second heat exchanger 36 along the warm water return flow path 22 with the steam S cooled in the first heat exchanger 34, by reuse of said steam S. That is to say, the temperature of said warm water changes from a warm temperature to a cool temperature before and after the second heat exchanger 36 {(warm)→(cool) in FIG. 7}. Meanwhile, the steam S cooled in the first heat exchanger 34 and flowing to the second circulation flow path 44 is heated by heat exchange with the warm water in the second heat exchanger 36. That is to say, the temperature of said steam S changes from a cool temperature to a warm temperature before and after the second heat exchanger 36 {(cool)→(warm) in FIG. 7}. After this, the temperature of said steam S changes from a warm temperature to a cool temperature as a result of the cold water W2 being introduced {(warm)→(cool) in FIG. 7}.

Furthermore, the extract flowing through the extract recovery flow path 24 is a warm material. This extract is cooled by heat exchange in the third heat exchanger 38 along the extract recovery flow path 24 with the steam S cooled by the cold water W2, by reuse of said steam S. That is to say, the temperature of said extract changes from a warm temperature to a cool temperature before and after the third heat exchanger 38 {(warm)→(cool) in FIG. 7}. Meanwhile, the steam S cooled by the cold water W2 and flowing to the second recirculation flow path 44 is heated by heat exchange with the warm water in the third heat exchanger 38. That is to say, the temperature of said steam S changes from a cool temperature to a warm temperature before and after the third heat exchanger 38 {(cool)→(warm) in FIG. 7}.

After this, the extract is further cooled by heat exchange with the cold water W1 in the fourth heat exchanger 40. That is to say, the temperature of said extract changes from a cool temperature to a cooler temperature before and after the fourth heat exchanger 40 {(cool)→(cooler) in FIG. 7}. Meanwhile, the cold water W1 is heated by heat exchange with the extract in the fourth heat exchanger 40. That is to say, said cold water W1 forms warm water that has changed from a cool temperature to a warm temperature before and after the fourth heat exchanger 40 {(cool)→(warm) in FIG. 7}.

Furthermore, the warm water that has returned from the water return flow path 22 to the water storage tank 12 once again flows through the warm water supply flow path 20. Said warm water is then heated by heat exchange in the first heat exchanger 34 along said warm water supply flow path 20 with the steam S heated in the third heat exchanger 38, by reuse of said steam S. That is to say, the temperature of said warm water changes from a cool temperature to a warm temperature before and after the first heat exchanger 34 {(cool)→(warm) in FIG. 7}. Meanwhile, the steam S heated in the third heat exchanger 38 and flowing to the second circulation flow path 44 is cooled by heat exchange with the warm water in the first heat exchanger 34. That is to say, the temperature of said steam S changes from a warm temperature to a cool temperature before and after the first heat exchanger 34 {(warm)→(cool) in FIG. 7}.

The series of production steps is terminated after the abovementioned extraction termination preparation and warm water preparation step.

Action

The action of this mode of embodiment will be described next.

According to this mode of embodiment, the second heat exchanger 36 performs heat exchange by reusing the steam S which underwent heat exchange in the first heat exchanger 34, so it is possible to reduce (to zero, for example) the amount of newly-introduced steam used for heat exchange in the second heat exchanger 36, and it is thereby possible to reduce the consumption amount of steam used for heat exchange.

Furthermore, according to this mode of embodiment, the first heat exchanger 34 reuses the steam S which underwent heat exchange in the second heat exchanger 36, so it is possible to reduce the amount of newly-introduced steam used for heat exchange in the first heat exchanger 34, and it is thereby possible to further reduce the consumption amount of steam used for heat exchange.

Furthermore, according to this mode of embodiment, the third heat exchanger 38 performs heat exchange by reusing the steam S which underwent heat exchange in the first heat exchanger 34, so it is possible to reduce the amount of newly-introduced steam used for heat exchange in the third heat exchanger 38, and it is thereby possible to further reduce the consumption amount of steam used for heat exchange.

Furthermore, according to this mode of embodiment, the first heat exchanger 34 reuses the steam S which underwent heat exchange in the third heat exchanger 38, so it is possible to reduce the amount of newly-introduced steam used for heat exchange in the first heat exchanger 34, and it is thereby possible to further reduce the consumption amount of heat exchange medium used for heat exchange.

Furthermore, according to this mode of embodiment, the flow path switching unit including the valves 48, 50, 52 and the control unit C switches the flow path that circulates the steam S to either the first circulation flow path 42 or the second circulation flow path 44, and as a result it is possible to switch whether or not heat exchange is performed in relation to the extract, and heat exchange can be efficiently performed.

Furthermore, according to this mode of embodiment, the adjustment unit including a valve which is not depicted and the control unit C adjusts the amount of steam S1, S2 introduced from the first introduction port 54 and the second introduction port 56, so the range of adjustment is increased and heat exchange can be performed more efficiently than when the amount of steam S1 introduced is adjusted in only the first introduction port 54.

Furthermore, according to this mode of embodiment, the water can be circulated between the warm water storage tank 12, the warm water supply flow path 20, and the warm water return flow path 22, and repeatedly subjected to heat exchange in the first heat exchanger 34 and the second heat exchanger 36 along said flow paths. As a result, it is possible to set the temperature of the warm water at the optimum temperature for extraction by the extractor 14.

Variant Examples

A preferred mode of embodiment of the present invention was described above with reference to the appended drawings, but the present invention is not limited to this example. It is obvious that a person skilled in the art will be able to conceive of various modified examples and amended examples within the scope of the concept disclosed in the patent claims, and it will of course be understood that these also lie within the technical scope of the present invention.

For example, according to a mode of embodiment, the third heat exchanger 38 and/or the fourth heat exchanger 40 may be omitted.

Furthermore, according to a mode of embodiment, a tank or the like for temporarily receiving the extract may be provided in the extract recovery flow path 24 between the extractor 14 and the extract storage tank 16.

Furthermore, the mode of embodiment described a case in which the steam S is used as the heat exchange medium for performing heat exchange with the warm water, but there is no particular limitation as to the heat exchange medium, and it is equally possible to use warm water (e.g., pressurized warm water) which is the same as the abovementioned warm water, for example.

KEY TO SYMBOLS

10: Extract production system
12: Water storage tank (solvent storage unit)
14: Extractor (extraction unit)
20: Warm water supply flow path (solvent supply flow path)
22: Warm water return flow path (solvent return flow path)
34: First heat exchanger (first heat exchange unit)
36: Second heat exchanger (second heat exchange unit)
38: Third heat exchanger (third heat exchange unit)
42: First circulation flow path
44: Second circulation flow path
48, 50, 52: Valve (flow path switching unit)
54: First introduction port (first introduction unit)
56: Second introduction port (second introduction unit)
C: Control unit (flow path switching unit, adjustment unit)

The invention claimed is:

1. An extract production system comprising:
   an extraction unit for extracting an extract from a starting material by using a solvent flowing into the interior thereof;
   a first heat exchange unit positioned on a solvent supply flow path upstream of the extraction unit for subjecting the solvent flowing into the extraction unit to heat exchange by using a heat exchange medium;
   a second heat exchange unit positioned on a solvent return flow path for subjecting the solvent which underwent heat exchange in the first heat exchange unit to heat exchange by reusing the heat exchange medium which underwent heat exchange in the first heat exchange unit; and
   a solvent storage unit connecting the solvent supply flow path and the solvent return flow path;
   wherein the solvent supply flow path and the solvent return flow path meet at a branch point such that the solvent may flow into the extraction unit or the solvent return flow path.

2. The extract production system as claimed in claim 1, wherein the first heat exchange unit reuses the heat exchange medium which underwent heat exchange in the second heat exchange unit.

3. The extract production system as claimed in claim 1, further comprising:
   the solvent storage unit for storing the solvent;
   the solvent supply flow path connects the solvent storage unit and the extraction unit, has the first heat exchange unit disposed thereon, and causes the solvent stored in the solvent storage unit to flow to the extraction unit; and the solvent return flow path branches from the solvent supply flow path downstream of the first heat exchange unit to connect the solvent supply flow path and the solvent storage unit, has the second heat exchange unit disposed thereon, and returns the solvent which underwent heat exchange in the first heat exchange unit to the solvent storage unit.

4. The extraction system as claimed in claim 1, further comprising a third heat exchange unit positioned on a recovery flow path downstream of the extraction unit for subjecting the extract extracted by the extraction unit to heat exchange by reusing the heat exchange medium which underwent heat exchange in the first heat exchange unit.

5. The extract production system as claimed in claim 4, wherein the first heat exchange unit reuses the heat exchange medium which underwent heat exchange in the third heat exchange unit.

6. The extract production system as claimed in claim 4, further comprising:
a first circulation flow path for circulating the heat exchange medium between the first heat exchange unit and the second heat exchange unit;
a second circulation flow path for circulating the heat exchange medium between the first heat exchange unit, the second heat exchange unit and the third heat exchange unit; and
a flow path switching unit for switching the flow path that circulates the heat exchange medium to either the first circulation flow path or the second circulation flow path.

7. The extract production system as claimed in claim 6, comprising:

a first introduction unit which is provided upstream of the first heat exchange unit in a circulation flow path including the first circulation flow path and the second circulation flow path, and introduces the heat exchange medium into the circulation flow path;
a second introduction unit which is provided in a different location from the first introduction unit, upstream of the first heat exchange unit in the circulation flow path, and introduces the heat exchange medium into the circulation flow path; and
an adjustment unit for adjusting the amount of the heat exchange medium introduced from the first introduction unit and the second introduction unit.

8. A method for producing an extract, comprising:
a storing step in which a solvent is stored in a solvent storage unit;
an extraction step in which the extract is extracted from a starting material by using the solvent flowing into the interior of an extraction unit;
a first heat exchange step in which the solvent flowing into the extraction step is subjected to heat exchange by using a heat exchange medium on a solvent supply flow path; and
a second heat exchange step in which the solvent which underwent heat exchange in the first heat exchange step is subjected to heat exchange on a solvent return flow path branching from the solvent supply flow path by reusing the heat exchange medium which underwent heat exchange in the first heat exchange step; or
a third heat exchange step in which the extract is subjected to heat exchange on a recovery flow path by reusing the heat exchange medium which underwent heat exchange in the second heat exchange step.

* * * * *